(12) United States Patent
Park et al.

(10) Patent No.: US 7,697,190 B2
(45) Date of Patent: Apr. 13, 2010

(54) ELECTRODE STRUCTURE OF ELECTROCHROMIC DEVICE

(75) Inventors: Kee Yong Park, Daejeon (KR); Hyun Woo Shin, Gwacheon-si (KR)

(73) Assignee: LG Chem, Ltd., Seoul (KR)

(*) Notice: Subject to any disclaimer, the term of this patent is extended or adjusted under 35 U.S.C. 154(b) by 786 days.

(21) Appl. No.: 11/590,745

(22) Filed: Nov. 1, 2006

(65) Prior Publication Data

US 2007/0097482 A1    May 3, 2007

(30) Foreign Application Priority Data

Nov. 2, 2005    (KR) ............ 10-2005-0104393

(51) Int. Cl.
*G02F 1/153* (2006.01)
(52) U.S. Cl. .............................. 359/271; 359/267
(58) Field of Classification Search ........... 359/265, 359/267, 269, 270, 271
See application file for complete search history.

(56) References Cited

U.S. PATENT DOCUMENTS 5,148,306 A    9/1992    Yamada et al.

7,511,873 B2 *   3/2009    Park ..................... 359/271

FOREIGN PATENT DOCUMENTS

| EP | 1 411 386 | 4/2004 |
|---|---|---|
| JP | 02-196957 | 8/1990 |
| JP | 02-216131 | 8/1990 |
| JP | 04-097230 | 3/1992 |
| WO | WO 03/081330 | 10/2003 |
| WO | WO 2004/029710 | 4/2004 |
| WO | WO 2007/052951 A1 * | 5/2007 |

OTHER PUBLICATIONS

Written Opinion of the International Searching Authority (PCT/ISA/237) prepared in connection with related international application PCT/KR2006/004509 (May 6, 2008).*

* cited by examiner

*Primary Examiner*—David N Spector
(74) *Attorney, Agent, or Firm*—McKenna Long & Aldridge LLP

(57) ABSTRACT

Disclosed is an electrochromic device, which includes a first electrode formed on a first region of a first substrate, a second electrode formed on a second region of the first substrate, an electrochromic layer formed on the first electrode, an electrolyte layer formed on both of the electrochromic layer and the second electrode, and a second substrate formed on the electrolyte layer; and a display device including the electrochromic device.

19 Claims, 6 Drawing Sheets

| second substrate (37) ||
|---|---|
| electrolyte layer (33) ||
| electrochromic layer (32) | ion storage layer (35) |
| first electrode (31) | second electrode (36) |
| first substrate (30) ||

(a)

| second substrate (37) ||
|---|---|
| electrolyte layer (33) ||
| electrochromic layer (32) | ion storage layer (35) |
| first electrode (31) | second electrode (36) |
| first substrate (30) ||

(b)

FIG. 3
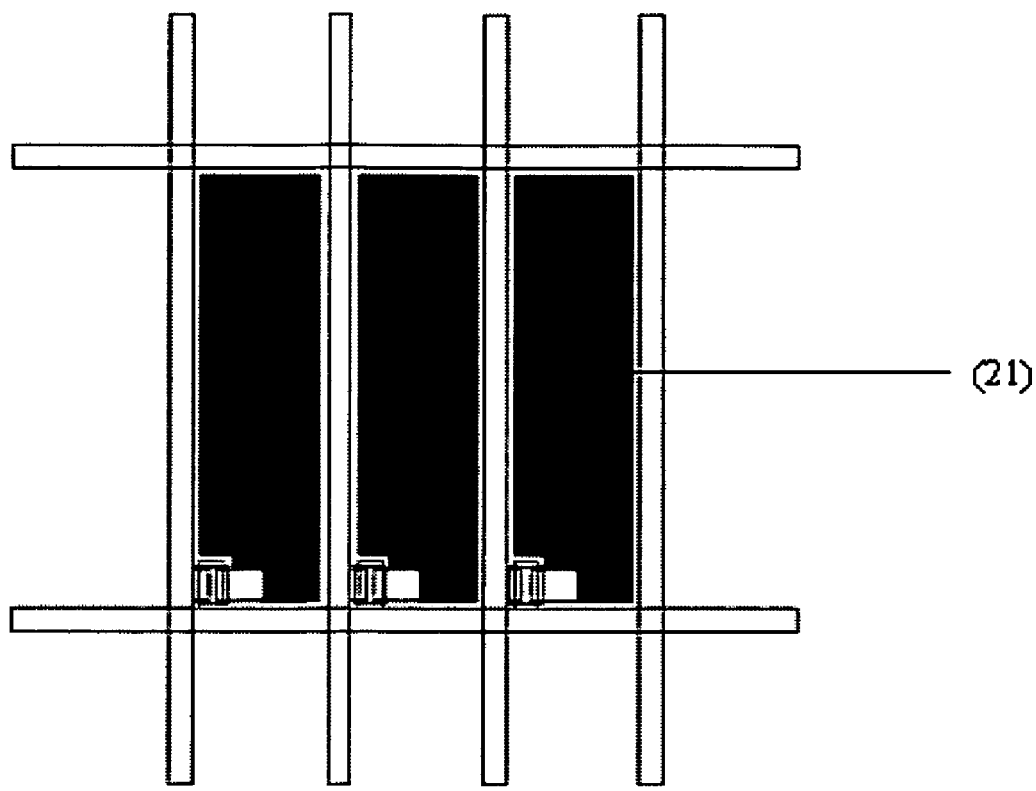
(a)
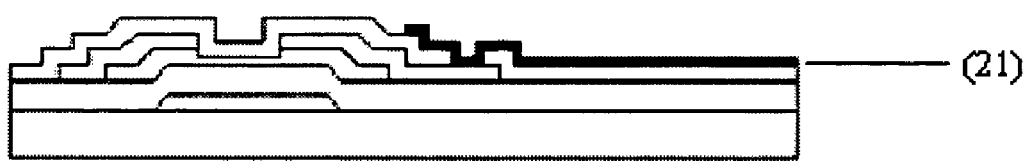
(b)
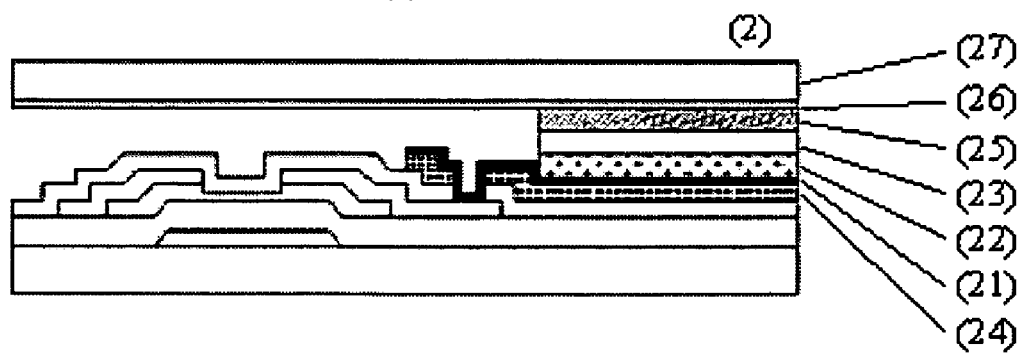
(c)

FIG. 4

| second substrate (37) ||
|---|---|
| electrolyte layer (33) ||
| electrochromic layer (32) | ion storage layer (35) |
| first electrode (31) | second electrode (36) |
| first substrate (30) ||

(a)

| second substrate (37) ||
|---|---|
| electrolyte layer (33) ||
| electrochromic layer (32) | ion storage layer (35) |
| first electrode (31) | second electrode (36) |
| first substrate (30) ||

(b)

FIG. 6
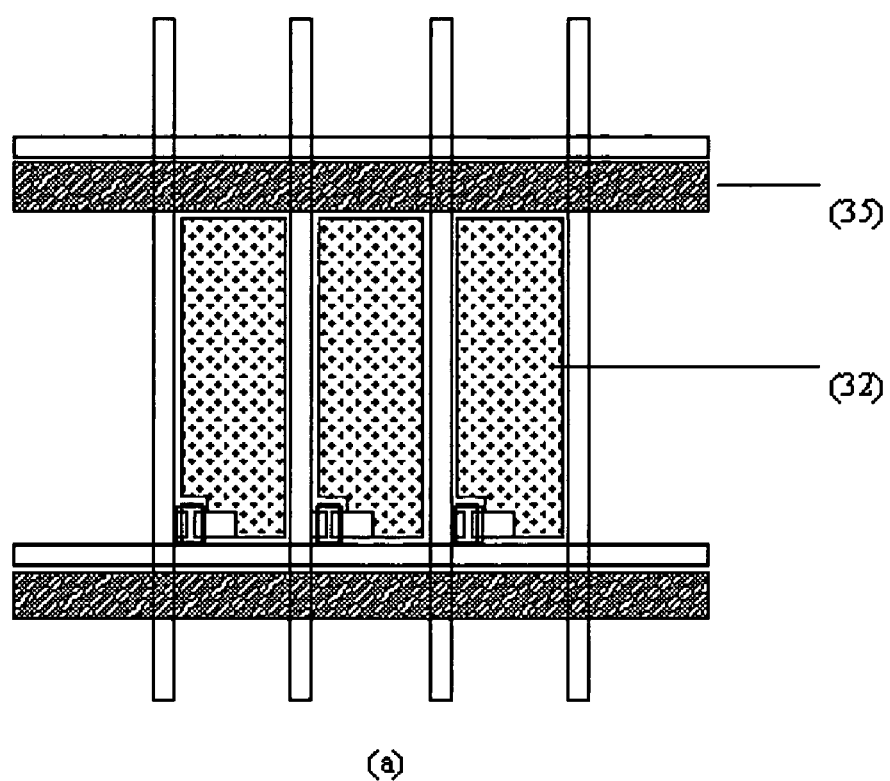
(a)
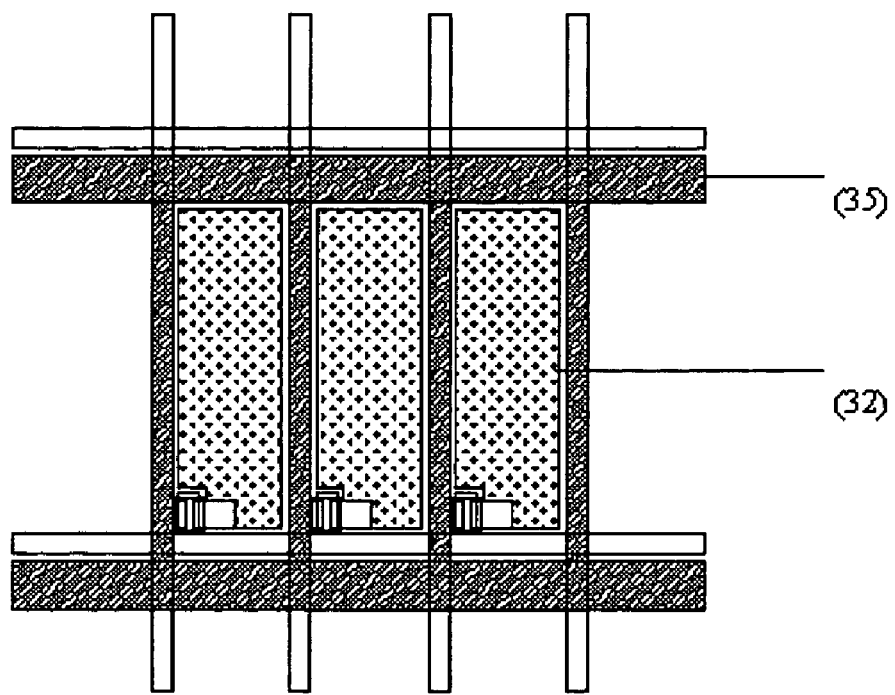
(b)

ELECTRODE STRUCTURE OF ELECTROCHROMIC DEVICE

This application claims the benefit of the filing date of Korean Patent Application No. 2005-104393, filed on Nov. 2, 2005, in the Korean Intellectual Property Office, the disclosure of which is incorporated herein in its entirety by reference.

TECHNICAL FIELD

The present invention relates to an electrochromic device, the color of which changes in response to an electric signal applied to the electrochromic device, and a display device including the electrochromic device.

BACKGROUND ART

In general, display devices are broadly classified into light-emitting display devices, such as a cathode ray tube (CRT), a plasma display panel (PDP), a light-emitting diode (LED), and an organic light-emitting diode (OLED), and non-emissive display devices such as a liquid crystal display (LCD). The former has a disadvantage in that a displayed image is vaguely shown in a light space although it has a fast response speed, and the latter has a disadvantage in that the response speed thereof is slow although a displayed image is clearly shown in the light space. Among these display devices, an electrochromic device (ECD) is a type of non-emissive display device, like the LCD. The electrochromic device is a display device which adjusts the color of electrochromic material by controlling a chemical reaction through the application of an electric signal.

Meanwhile, FIG. 1 is a cross-sectional view schematically illustrating the basic structure of an electrochromic device. Referring to FIG. 1, the electrochromic device 1 includes a first electrode 11 formed on a first glass substrate 10, and a second electrode 16 formed on a second glass substrate 17, in which the first and second electrodes 11 and 16 are spaced while facing each other. In addition, the electrochromic device 1 includes an electrochromic layer 12, an electrolyte layer 13, and an ion storage layer 15. The electrochromic layer 12 is formed on the upper surface of the first electrode 11 and includes electrochromic material, the color of which changes depending on an applied electric signal. The electrolyte layer 13 is formed on the top of the electrochromic layer 12 and includes ions concerned in an electrochromic reaction. The ion storage layer 15 is formed on the second electrode 16 and gathers ions having a polarity opposite to that of the ions concerned in the electrochromic reaction.

Generally, at least one of the first and second electrodes 11 and 16 employs a transparent electrode, for example, an indium-tin oxide (ITO) electrode. The ion storage layer 15 may be omitted.

When forward voltage is applied to the electrochromic device 1 so as to let an electric current flow from the electrochromic layer to the ion storage layer, the electrochromic layer 12 is colored, and when reverse voltage is applied to the electrochromic device 1 so as to let an electric current flow from the ion storage layer to the electrochromic layer, the electrochromic layer 12 is bleached. Meanwhile, according to the material of the electrochromic layer, the electrochromic layer may be colored or bleached by the flow of electric current in the opposite directions.

FIG. 2a is a view illustrating the layout of an electrochromic layer for displaying numbers in a 7-segment pattern, and FIG. 2b is a view illustrating the layout of a conventional electrode for applying an electric signal to the electrochromic layer of FIG. 2a. FIGS. 2a and 2b show an example of a direct-driving type electrochromic display device in which separate electrodes are connected to each segment or each pixel, respectively.

Meanwhile, an active-matrix-driving type electrochromic display device is constructed, for example, such that a number of electrochromic pixels are mounted on a panel equipped with a switching element for each pixel. Since the on/off operation of each pixel in such an electrochromic display device is independently controlled, the electrochromic display device has advantages in that it can realize a relatively higher image quality and a relatively faster response speed, and has excellent resolution and moving picture realization capability. In this case, it is well known that a thin film transistor (TFT) is used as the switching element.

FIG. 3a is a view illustrating the structure of an electrode of a thin film transistor in a typical active-matrix-driving type electrochromic device. Herein, an electrode 21 for applying a signal directly to a pixel corresponds to the first electrode 11 of FIG. 1.

FIG. 3b is a cross-sectional view of the thin film transistor shown in FIG. 3a. A direct-driving type device and an active-matrix-driving type device have structures similar to each other, except for a TFT existing beneath the first electrode.

FIG. 3c is a view illustrating the simplest structure obtained when the electrochromic device of FIG. 1 is formed on the TFT of FIG. 3b.

Meanwhile, observer's eyes to the electrochromic device are oriented toward a second substrate 27. Therefore, the observer's eyes need to pass through an ion storage layer 25 and a second electrode 26 in order to see a displayed color. Then, the contrast ratio is degraded as much.

Particularly, when the ion storage layer 25 is a colored layer, a color reproduction rate as well as a contrast ratio is degraded Background Art

DISCLOSURE THE INVENTION

Therefore, the present invention has been made in view of the above-mentioned problems, and it is an object of the present invention to prevent a contrast ratio from being degraded due to an ion storage layer and a second electrode when observer's eyes are oriented toward the second substrate in the conventional electrochromic device, in which a first substrate, a first electrode, an electrochromic layer, an electrolyte layer, the ion storage layer, the second electrode, and the second substrate are sequentially laminated.

To this end, the present invention provides an electrochromic device having such structure that only the second substrate and the electrolyte layer exist between the observer's eyes and the electrochromic layer, by forming the ion storage layer and/or the second electrode in a separate region on the first substrate, instead of the regions above the electrochromic layer.

According to an aspect of the present invention, there is provided an electrochromic device, which includes a first electrode formed on a first region of a first substrate, a second electrode formed on a second region of the first substrate, an electrochromic layer formed on the first electrode, an electrolyte layer formed on both of the electrochromic layer and the second electrode, and a second substrate formed on the electrolyte layer; and a display device including the electrochromic device.

BRIEF DESCRIPTION OF THE DRAWINGS

The foregoing and other objects, features and advantages of the present invention will become more apparent from the following detailed description when taken in conjunction with the accompanying drawings in which:

FIG. 2b is a view illustrating the layout of a conventional direct-driving type lower electrode for applying an electric signal to the electrochromic layer of FIG. 2a;

FIG. 3a is a view illustrating the structure of an electrode of a thin film transistor in a typical active-matrix-driving type electrochromic device, FIG. 3b is a cross-sectional view of the thin film transistor shown in FIG. 3A, and FIG. 3C is a view illustrating the structure of an electrochromic device in which the electrochromic device of FIG. 1 is formed on the TFT of FIG. 3b;

FIGS. 4a and 4b are views schematically illustrating the basic sectional structure of an electrochromic device according to an embodiment of the present invention;

FIGS. 5a to 5d illustrate an example in which the electrochromic device according to the present invention is applied to an active-matrix-driving scheme, in which FIG. 5a is a view illustrating the layout of the electrochromic layer and the ion storage layer in an active-matrix-driving type electrochromic device according to the present invention, FIG. 5b is a cross-sectional view illustrating the structure of the active-matrix-driving type electrochromic device according to the present invention, FIG. 5c is a side-sectional view illustrating the structure of the active-matrix-driving type electrochromic device according to the present invention, and FIG. 5d is a view illustrating the structure of a electrochromic device in which a reflection layer is disposed beneath a TFT substrate, that is, on the outside of the cell; and FIG. 6a is a view illustrating a modified example of the present invention in which the ion storage layer is formed to be thick in order to have a reduced area so that the area of the electrochromic device increases, and FIG. 6b is a view illustrating another modified example of the present invention in which the ion storage layer is formed in an empty space not occupied by the electrochromic layer so that the area occupied by the electrochromic device increases.

BEST MODE FOR CARRYING OUT THE INVENTION

Figure 1:
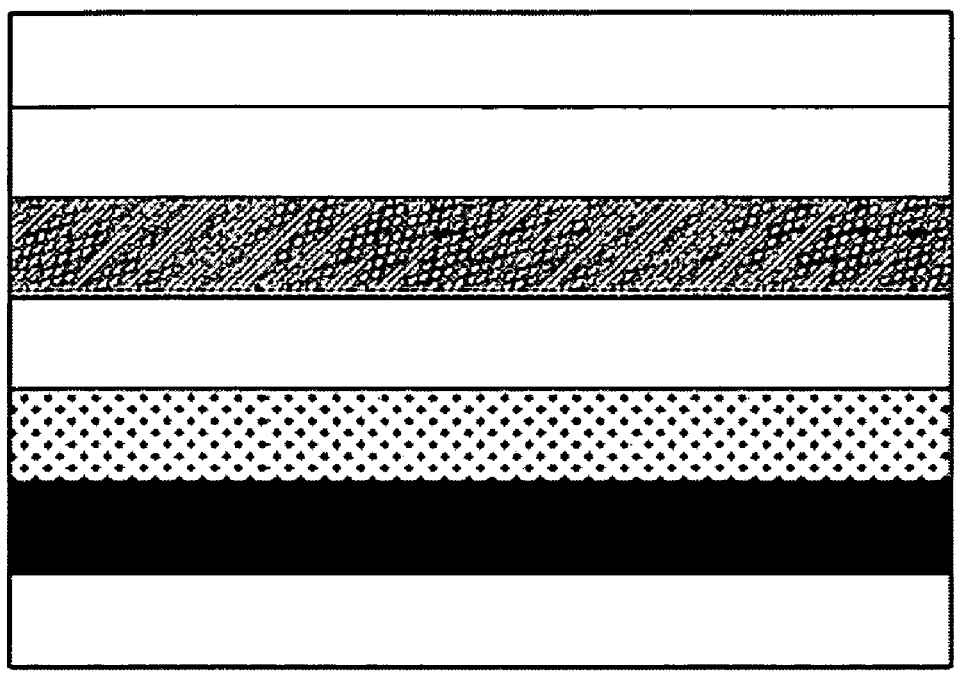
FIG. 1 is a cross-sectional view schematically illustrating the basic structure of a conventional electrochromic device.
Figure 2A:
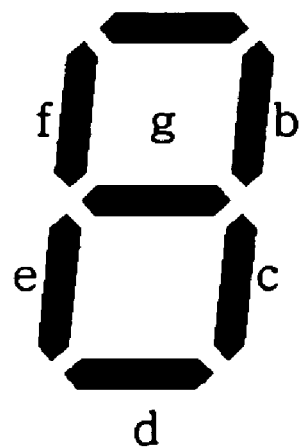
FIG. 2a is a view illustrating the layout of an electrochromic layer for displaying numbers in a 7-segment pattern.
Figure 2B:
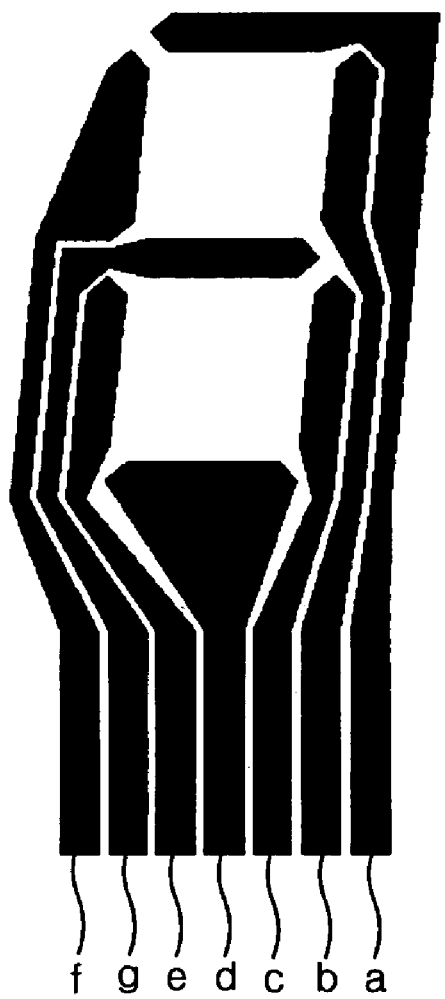

Reference will now be made in detail to the preferred embodiments of the present invention.

Referring to FIGS. 4a and 4b, according to the electrochromic device based on the present invention, a first electrode 31 is formed on a first region of a first substrate 30, and a second electrode 36 is formed on a second region of the first substrate 30. In addition, an electrochromic layer 32 is formed on the first electrode 31, an electrolyte layer 33 is formed on both of the electrochromic layer 32 and the second electrode 36, and a second substrate 37 is formed on the electrolyte layer 33.

Selectively, an ion storage layer 35 may be formed between the second electrode 36 and the electrolyte layer 33.

It is preferred that the ion storage layer and/or the second electrode are formed on an empty space not occupied by the electrochromic layer, for example, on the second region.

According to the structure of the electrochromic device based on the present invention, the region on the first substrate is partitioned into two regions, and two electrodes (i.e., first and second electrodes) for applying an electric signal for an electrical electrochromic reaction are formed on the two regions, respectively. In this case, a region formed by the first electrode and the electrochromic layer may be constructed as a display region, and a region formed by the second electrode and/or the ion storage layer may be constructed as a non-display region. In this case, the first electrode and the second electrode are patterned to be spatially-separated from each other, thereby being insulated from each other.

The characteristic of the present invention is to form the second electrode 36 and/or the ion storage layer 35 on the same surface as that on which the electrochromic layer 32 is formed in order to prevent the electrochromic layer 32 from being screened by the second electrode 36 and/or the ion storage layer 35.

Therefore, according to the electrochromic device based on the present invention, only the second substrate and electrolyte layer exist between the observer's eyes and the electrochromic layer, so that it is possible to prevent a contrast ratio from being degraded due to the ion storage layer and/or the second electrode.

Also, according to the present invention, the first electrode, the second electrode, and the ion storage layer are not located between the observer's eyes and the electrochromic layer, so it is unnecessary to satisfy a transparency condition.

Preferably, the first electrode is connected to a thin film transistor (TFT), while the second electrode is connected directly to an external driving circuit. When the TFT is not used, the first electrode also may be connected directly to the external driving circuit.

Electrochromic material may be a semiconductor oxide deposited as a sequential layer on an electrode coated on a substrate, thereby forming an electrochromic layer. Representative electrochromic material includes inorganic metal oxides such as a tungsten oxide ($WO_3$), a Nickel oxide (NiO), and a Titanium oxide ($TiO_2$), and organic material such as bipyridinium salt (viologen) derivatives, quinone-based derivatives (for example, antraquinone), and azine-based derivatives (for example, phenothiazine).

The first and second electrodes may be formed by using transparent electrodes, such as ITO or FTO, but the present invention is not limited thereto.

Electrolyte may be in various phases such as liquid, solid, etc., and the electrolyte layer may be replaced by an ionic liquid layer containing ionic liquid.

The ion storage layer may be formed by using metal oxide nanoparticles such as antimony-doped tin oxide (ATO), or electrochromic material having a polarity opposite to that used for the first electrode.

In the electrochromic device according to the present invention, a reflection layer may be additionally formed on the inside or outside of the electrochromic device. In the electrochromic device according to the present invention, the observer's eyes are oriented toward the second substrate 37. Therefore, when a white background is required, the reflection layer 34 must be formed beneath or below the electrochromic layer 32.

In the electrochromic device according to the present invention, electric current flows along the electrochromic layer, the first electrode, a driving circuit, the second electrode, and the ion storage layer (herein, the ion storage layer may be excluded); the ions in the electrolyte move; and a chemical reaction is generated and/or an electric current flows between the electrolyte layer and the first electrode, electrochromic layer, second electrode, and ion storage layer (herein, the ion storage layer may be excluded).

FIGS. 5a to 5d are views illustrating a case in which the electrochromic device according to the present invention is applied to an active-matrix-driving scheme.

According to the present invention, the electrochromic layer 32 and the ion storage layer 35 are formed through patterning on different regions in an equal surface, so that it is possible to locate only the second substrate 37 and electrolyte layer 33 between the observer's eyes and the electrochromic layer.

Figure 5:
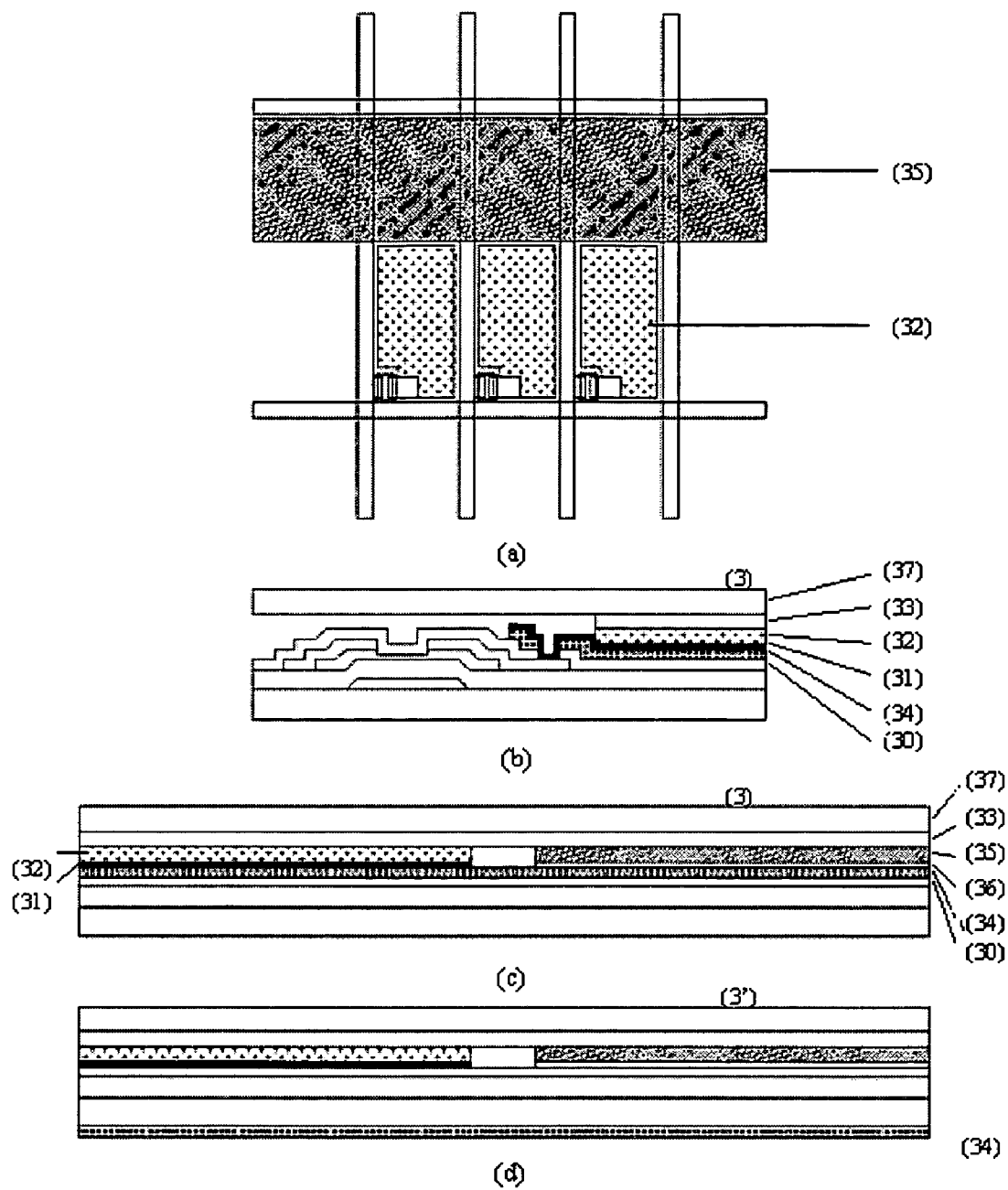

Referring to FIGS. 5a, 5b, and 5c, an electrochromic device 3 includes: a first substrate 30, which contains a TFT and a passivation layer formed on the TFT; a reflection layer 34 formed on the top of first substrate; a first electrode 31 formed on the top of the reflection layer; an electrochromic layer 32 which is formed on the top of the first electrode and includes electrochromic material that changes the color thereof depending on an applied electric signal; an electrolyte layer 33 which is formed on the top of the electrochromic layer 32 and includes ions concerned in an electrochromic reaction; an ion storage layer 35 which is formed beneath the electrolyte layer and gathers ions having a polarity opposite to that of the ions concerned in the electrochromic reaction; a second electrode 36 which is formed beneath the ion storage layer and provides electric charges to the ion storage layer; and a second substrate 37 formed at the top position of the electrochromic device.

In this case, one first electrode may be formed for each display region, and may be connected to a switching element (e.g., TFT) for controlling the on/off operation for each display region. At least one of each of the first electrode and the electrochromic layer exists in each display region.

In this case, each of the first substrate, the electrolyte layer, the ion storage layer, the second electrode, and the second substrate may be formed as a single layer in spatial commonality throughout all of at least one pixel. Also, the electrolyte layer, the ion storage layer, and the second electrode may be patterned upon each pixel.

When forward voltage is applied to the electrochromic device 3 so as to let an electric current flow from the ion storage layer 35 to the electrochromic layer 32, the electrochromic layer 32 is colored, and when reverse voltage is applied to the electrochromic device 3 so as to let an electric current flow from the electrochromic layer 32 to the ion storage layer 35, the electrochromic layer 32 is bleached. Meanwhile, according to the material of the electrochromic layer, the electrochromic layer may be colored or bleached by the flow of electric current in the opposite directions.

In the electrochromic device, the ion storage layer, the reflection layer, and the passivation layer may be omitted according to circumstances.

FIG. 5d is a view illustrating the structure of an electrochromic device in which a reflection layer having a white background is disposed beneath a TFT substrate i.e., on the outside of the cell (on the outside of the electrochromic device) so that a manufacturing process can be further simplified.

Meanwhile, the larger the area occupied by the electrochromic layer is, the clearer the color displayed in a panel becomes. In order to obtain excellent display performance, the quantities of electric charges stored in the electrochromic layer 32 and the ion storage layer 35 must be similar to each other, which is influenced by material, and each layer's area and thickness.

FIG. 5a is an exemplary view illustrating an electrochromic device in which an electrochromic layer 32 and an ion storage layer 35, having similar thicknesses and area, are formed.

Preferably, the ion storage layer is formed to be thicker than the electrochromic layer so that the electrochromic layer can occupy a larger area than the ion storage layer. FIG. 6a is a view illustrating a case in which the ion storage layer 35 is formed to be thick in order to have a reduced area so that the area of the electrochromic layer 32 for expressing color can increase according to an embodiment of the present invention.

Also, it is preferred that an ion storage layer is formed in an empty space not occupied by the electrochromic layer, so as to increase the area of the electrochromic layer. FIG. 6b is a view illustrating a case in which the ion storage layer 35 is formed in all empty space (e.g., in all non-display region) not occupied by the electrochromic layer 32, so as to increase the area occupied by the electrochromic layer 32 for actually expressing color according to an embodiment of the present invention.

In addition, the electrochromic device according to the present invention may be used to construct a display device. Particularly, when the electrochromic device according to the present invention is employed in a direct-driving type or active-matrix-driving type display device, it is possible to improve the performance of the display device through a simple manufacturing process. For example, the present invention can achieve an electrochromic display device which provides clear display even when the transparency of the ion storage layer 25 and the upper electrode 26 is reduced, with a process similar to the conventional process.

INDUSTRIAL APPLICABILITY

As can be seen from the foregoing, according to the electrochromic device of the present invention, only the second substrate and electrolyte layer are located between the observer's eyes and the electrochromic layer, so that it is possible to prevent a contrast ratio from being degraded due to the ion storage layer and/or second electrode.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An electrochromic device comprising:
   a first electrode formed on a first region of a first substrate;
   a second electrode formed on a second region of the first substrate;
   an electrochromic layer formed on the first electrode;
   an electrolyte layer formed on both of the electrochromic layer and the second electrode; and
   a second substrate formed on the electrolyte layer.

2. The electrochromic device as claimed in claim 1, wherein an ion storage layer is formed between the second electrode and the electrolyte layer.

3. The electrochromic device as claimed in claim 1, wherein the second electrode is formed in an empty space not occupied by the electrochromic layer.

4. The electrochromic device as claimed in claim 2, wherein the ion storage layer is formed in an empty space not occupied by the electrochromic layer.

5. The electrochromic device as claimed in claim 2, wherein the ion storage layer is thicker than the electrochromic layer, so as to increase an area occupied by the electrochromic layer.

6. The electrochromic device as claimed in claim 1, wherein the electrolyte layer is an ionic liquid layer which contain ions concerned in an electrochromic reaction.

7. The electrochromic device as claimed in claim 1, wherein the first and second electrodes are connected directly to an external driving circuit.

8. The electrochromic device as claimed in claim 1, wherein the first electrode is formed on a thin film transistor, and the second electrode is connected directly to an external driving circuit.

9. The electrochromic device as claimed in claim 1, wherein a reflection layer is formed on an inside or outside of the electrochromic device.

10. A display device comprising the electrochromic device as claimed in claim 1,
wherein the electrochromic device comprises:
a first electrode formed on a first region of a first substrate;
a second electrode formed on a second region of the first substrate;
an electrochromic layer formed on the first electrode;
an electrolyte layer formed on both of the electrochromic layer and the second electrode; and
a second substrate formed on the electrolyte layer.

11. The display device as claimed in claim 10, wherein the electrochromic device is driven either in a direct driving scheme or in an active-matrix-driving scheme.

12. The display device as claimed in claim 10, wherein an ion storage layer is formed between the second electrode and the electrolyte layer.

13. The display device as claimed in claim 10, wherein the second electrode is formed in an empty space not occupied by the electrochromic layer.

14. The display device as claimed in claim 10, wherein the ion storage layer is formed in an empty space not occupied by the electrochromic layer.

15. The display device as claimed in claim 10, wherein the ion storage layer is thicker than the electrochromic layer, so as to increase an area occupied by the electrochromic layer.

16. The display device as claimed in claim 10, wherein the electrolyte layer is an ionic liquid layer which contain ions concerned in an electrochromic reaction.

17. The display device as claimed in claim 10, wherein the first and second electrodes are connected directly to an external driving circuit.

18. The display device as claimed in claim 10, wherein the first electrode is formed on a thin film transistor, and the second electrode is connected directly to an external driving circuit.

19. The display device as claimed in claim 10, wherein a reflection layer is formed on an inside or outside of the electrochromic device.

* * * * *